United States Patent
Blasinski

(10) Patent No.: US 11,453,379 B2
(45) Date of Patent: Sep. 27, 2022

(54) METHOD FOR OPERATING A PHEV AND MOTOR VEHICLE CONFIGURED THEREFOR

(71) Applicant: AUDI AG, Ingolstadt (DE)

(72) Inventor: Boris Blasinski, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 252 days.

(21) Appl. No.: 16/911,798

(22) Filed: Jun. 25, 2020

(65) Prior Publication Data
US 2021/0001833 A1 Jan. 7, 2021

(30) Foreign Application Priority Data
Jul. 4, 2019 (DE) .................... 10 2019 209 828.2

(51) Int. Cl.
| B60W 20/00 | (2016.01) |
| B60K 6/48 | (2007.10) |
| B60K 6/54 | (2007.10) |
| B60K 6/24 | (2007.10) |
| B60K 6/26 | (2007.10) |

(52) U.S. Cl.
CPC .............. *B60W 20/00* (2013.01); *B60K 6/48* (2013.01); *B60K 6/54* (2013.01); *B60K 6/24* (2013.01); *B60K 6/26* (2013.01); *B60W 2510/0638* (2013.01); *B60W 2520/10* (2013.01); *B60W 2520/12* (2013.01); *B60W 2552/05* (2020.02); *B60W 2554/408* (2020.02); *B60W 2556/50* (2020.02); *B60W 2710/10* (2013.01); *B60Y 2200/92* (2013.01)

(58) Field of Classification Search
None
See application file for complete search history.

(56) References Cited

FOREIGN PATENT DOCUMENTS

| CN | 108621777 A | * | 10/2018 | ............ B60K 6/365 |
| CN | 108667368 A | * | 10/2018 | ............ B60K 6/445 |
| CN | 208290960 U | * | 12/2018 | |
| CN | 104728372 B | * | 5/2019 | ............ F16H 3/66 |
| DE | 103 27 306 A1 | | 1/2005 | |
| DE | 10 2010 048 548 A1 | | 6/2011 | |
| DE | 102010048548 A1 | * | 6/2011 | ............ B60W 10/06 |
| DE | 10 2010 028 936 A1 | | 11/2011 | |
| DE | 10 2013 226 479 A1 | | 6/2015 | |
| DE | 102013226479 A1 | * | 6/2015 | ............ F16H 3/66 |
| DE | 10 2014 001 300 A1 | | 8/2015 | |
| DE | 102019209828 A1 | * | 1/2021 | ............ B60K 6/48 |
| EP | 2 183 138 B1 | | 6/2011 | |

OTHER PUBLICATIONS

Examination Report dated Apr. 30, 2020 in corresponding German application No. 10 2019 209 828.2; 18 pages including Machine-generated English-language translation.

* cited by examiner

*Primary Examiner* — Dirk Wright
(74) *Attorney, Agent, or Firm* — Maier & Maier, PLLC

(57) ABSTRACT

A method for operating a motor vehicle having a hybrid drive, and to a motor vehicle configured for carrying out the method. In a hybrid operating mode of the motor vehicle, a proportion of a purely electric driving operation is maximized by controlling the automatic transmission so a resulting rotational speed is not lower than a preset minimum value.

19 Claims, 1 Drawing Sheet

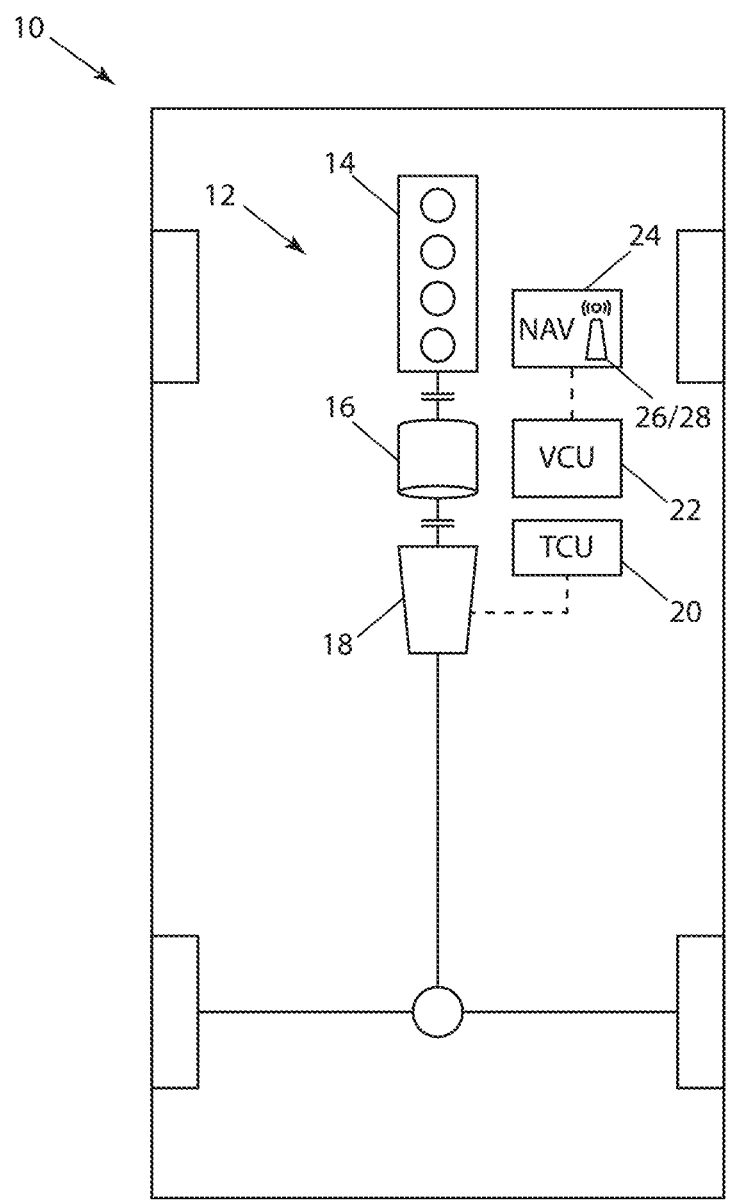

… (1) …

METHOD FOR OPERATING A PHEV AND MOTOR VEHICLE CONFIGURED THEREFOR

FIELD

The disclosure relates to a method for operating a motor vehicle having a hybrid drive, and to a motor vehicle configured for carrying out the method.

BACKGROUND

In a parallel hybrid vehicle (PHEV), a transmission (e.g. a stepped automatic transmission) with a conventional shifting strategy is used. The electric drive motor is typically positioned between internal combustion engine and transmission, which ensures that a shifting strategy will also function properly in the electric driving mode. There are currently two shifting strategies that are implemented: a first conventional shifting strategy, which is optimized for driving with an internal combustion engine, and a second shifting strategy, which is optimized for operation in the purely electric driving mode.

A shifting strategy that is optimized for the internal combustion engine typically ensures the lowest possible rotational speeds. When the drive is in hybrid mode, there are situations in which the operating strategy of the hybrid system seeks to provide maximum electric driving. This is a conflict of objectives, since higher rotational speeds tend to be optimal for maximum electric driving, to obtain the maximum output from the electric motor. As a consequence, the internal combustion engine is started during accelerations that could actually be provided electrically. When this occurs in situations that involve only brief accelerations (urban areas), in which uninterrupted periods of high vehicle performance (long-distance driving) are not required, unfavorable internal combustion engine load points and unnecessary exhaust gas emissions result.

DE 10 2010 028 936 A1 teaches a method for operating a drive train of a hybrid motor vehicle comprising an internal combustion engine, an electric motor, and an automated manual transmission, wherein the rotational speed of the electric motor is increased during shifting to a preparatory speed, based on a maximum torque that can be supplied. During the shifting process, the drive torque supplied at the output is first reduced, after which the actual shift is carried out, and then the drive torque at the output is built up again. The synchronization of the rotational speeds of the two motors during the shifting process results in improved comfort and minimized wear.

DE 103 27 306 A1 discloses a method for operating a drive unit of a motor vehicle having an internal combustion engine, an electric motor, and a transmission, in which for a clutch operation, the electric motor is accelerated to an overspeed within the range of a breakpoint speed. A first clutch is provided between the internal combustion engine and the electric motor, and a second clutch is provided on the output side of the electric motor, and upon starting of the internal combustion engine, the electric motor is operated, with a slipping first and a slipping second clutch, at a rotational speed which after closing of the first clutch and with the second clutch slipping under a load, drops to a rotational speed at a level that is higher than a rotational speed of the electric motor, which occurs when the second clutch is additionally closed.

DE 10 2010 048 548 A1 discloses a method for operating a drive train of a hybrid vehicle, in which the drive train is operated by internal combustion engine and/or electric motor in order to maximize efficiency. The operating mode of the hybrid vehicle is determined automatically on the basis of a setpoint torque and an operating state of the hybrid vehicle, and, depending on the determined operating mode, the internal combustion engine and/or the electric motor is/are coupled to the drive train for operation of the hybrid vehicle.

Against this background, the object of the disclosure is to provide a method for operating a motor vehicle with a hybrid drive (PHEV), which avoids unnecessary starts of the internal combustion engine, especially during city driving.

SUMMARY

The object is attained according to the disclosure by a method and a device.

The subject matter of the disclosure is a method for operating a motor vehicle, the drive train of which comprises an internal combustion engine (ICE), at least one electric motor, and an automatic transmission, the at least one electric motor being arranged between the internal combustion engine and the transmission (parallel hybrid, PHEV).

In the method according to the disclosure, when the motor vehicle is operating in a hybrid mode, the proportion of purely electric driving operation is maximized by controlling the automatic transmission in such a way that the resulting rotational speed does not drop below a preset minimum value. The preset minimum value is within a range of 0 to 100 rpm below the breakpoint speed of the at least one electric motor.

Within the scope of the present application, a hybrid operating mode is understood as an operating mode of the drive train in which the ICE, the at least one electric motor, or both the ICE and the at least one electric motor are used to drive the motor vehicle. When only the at least one electric motor is used to drive the motor vehicle and the ICE is switched off, this is referred to, in the scope of the present application, as purely electric driving operation.

The electric motor is preferably an inverter controlled three-phase motor, for example a reluctance motor, an asynchronous motor, or a permanently excited electric motor, which is capable of keeping its maximum torque constant up to a breakpoint speed. The breakpoint speed marks the beginning of the range of weakening of the electromagnetic field. As the rotational speed increases above the breakpoint speed, the maximum torque continues to decrease.

BRIEF DESCRIPTION OF THE DRAWINGS

The single FIGURE shows a schematic diagram of a motor vehicle according to the invention.

DETAILED DESCRIPTION

According to the disclosure, whenever maximum electric driving is sought during hybrid operation, the rotational speed is increased in order to obtain a higher output of the at least one electric motor and to prevent the internal combustion engine from starting. The shifting strategy of the automatic transmission is based on the breakpoint speed of the at least one electric motor, meaning that the rotational speed is just high enough to obtain the maximum available electric driving output from the system. The automatic transmission has a preset minimum rotational speed, which it must not drop below. The preset minimum rotational speed is within a range of 0 to 100 rpm below the breakpoint speed of the at least one electric motor. In this way, the basic shifting strategy of the automatic transmission, which is designed for the lowest possible rotational speeds, is overridden.

Thus, when the vehicle is in hybrid driving mode, if maximum electric driving output is appropriate and the ICE is switched off, then a minimum rotational speed will be demanded from the automatic transmission. The demanded minimum rotational speed is 0 to 100 rpm lower than the breakpoint speed of the at least one electric motor. The setpoint distance from the breakpoint speed is determined as a function of the gear steps, the current gear, and the characteristic curve for performance. At higher gears the distance between the demanded minimum rotational speed and the breakpoint speed is smaller than at low gears.

In one embodiment of the method, the increase in rotational speed is deactivated when a demand to start the ICE is received. Said increase is deactivated in order to avoid disrupting the starting procedure of the ICE. In a further embodiment of the method, increase in rotational speed is deactivated when the vehicle speed is 70 km/h or more. In yet another embodiment of the method, the increase in rotational speed is deactivated when the torque demanded by the driver is low in relation to the maximum torque of the electric motor.

In one embodiment of the method, the motor vehicle identifies situations in which it makes sense to maximize the proportion of purely electric driving, and initiates the increase in the rotational speed. Examples of situations that are ideal for electric driving include driving in urban areas, particularly in emission-sensitive zones, and in high-congestion areas and stop-and-go traffic. Zones at toll stations on highways or at border crossings are also ideal for purely electric driving, as such areas typically involve waiting periods.

In one embodiment, such situations are identified based on the vehicle speed. A situation in which the current vehicle speed is below a preset threshold value, e.g. 70 km/h, and/or the vehicle is frequently coming to a nearly full or full stop (stop-and-go) is ideal for purely electric driving, and as long as the vehicle's traction battery is sufficiently charged, the increase in the rotational speed will be activated.

In another embodiment of the method according to the disclosure, the motor vehicle uses satellite-based positioning to determine its vehicle position, and factors this vehicle position, combined with information from a digital road map, into its identification of situations that are ideal for purely electric driving, e.g. driving in urban areas, in emission-sensitive zones, and in zones at toll stations on highways or at border crossings.

In a further embodiment, the information from the digital road map is combined with information about the flow of traffic, provided, for example, by a traffic information system, in order to identify traffic congestion zones.

In a further variant, messages received by the motor vehicle via car-to-X communication are used for situation identification. Such messages provide specifics about the section of road in front of the vehicle. By factoring in these specifics, it can then be determined whether a situation ideal for purely electric driving may exist. As part of the car-to-X communication, the motor vehicle communicates with an infrastructure, e.g. a traffic management system.

In another embodiment, situations are identified via functions already implemented in the motor vehicle, for example a predictive operating strategy that controls the state of charge of the energy accumulator of the at least one electric motor in a proactive manner based on a planned driving route, to ensure a sufficient supply of power for purely electric driving phases in the city.

The advantages of the method according to the disclosure include the avoidance of unnecessary use of the internal combustion engine, resulting in reduced fuel consumption and lower exhaust gas emissions (frequent starts of the ICE with short running times have a considerable influence on particle emissions, for example). The method according to the disclosure makes it possible to increase the proportion of purely electric driving as needed during driving operation. Further advantages of the disclosure will be apparent from the description.

A further subject matter of the disclosure is a motor vehicle 10, shown schematically in the FIGURE, the drive train 12 of which comprises an internal combustion engine (ICE) 14, at least one electric motor 16, and an automatic transmission 18, the at least one electric motor 16 being arranged between the internal combustion engine 14 and the transmission 18 (parallel hybrid, PHEV).

The motor vehicle 10 further comprises a device 20 for controlling the automatic transmission (control unit), which is configured such that, when the motor vehicle 10 is operating by purely electric driving, the control unit 20 controls the automatic transmission 18 such that a rotational speed that is not lower than a preset minimum value results, which minimum value lies within a range of 0 to 100 rpm below the breakpoint speed of the at least one electric motor 16.

In one embodiment, the motor vehicle 10 comprises means for determining whether the motor vehicle is in a situation in which the proportion of purely electric driving operation should be maximized, i.e. a situation in which a starting of the ICE should be avoided if at all possible. In one embodiment, these means comprise functions that are implemented in a control unit of the motor vehicle 22. In one embodiment, these are functions for determining a current vehicle speed or a progression of the vehicle speed over time. In another embodiment, these are functions for determining a state of charge of a traction battery of the motor vehicle. In a further embodiment, a predictive operating strategy is implemented in the control unit, proactively regulating the state of charge of an energy accumulator of the at least one electric motor based on a planned driving route, in order to ensure a sufficient supply of power for purely electric driving phases in the city.

In one embodiment, the means for determining whether the motor vehicle is in a situation in which starting of the ICE should be avoided if at all possible comprises an electronic navigation system 24. In one embodiment, the electronic navigation system 24 ascertains the vehicle position via a mobile communications system at the wireless cell level. In another embodiment, the electronic navigation system determines the vehicle position on the basis of coordinates via a navigation satellite system. The navigation system thus comprises at least a GPS receiver 26 and/or a transmitter/receiver for mobile communications 28. The electronic navigation system is configured to combine the ascertained vehicle position with information from a digital road map and to identify situations that are ideal for purely electric driving, e.g. driving in urban areas, in emission-sensitive zones, in zones at toll stations on highways or at border crossings.

In a further embodiment, the navigation system is configured to receive information about the flow of traffic, which is provided, for example, by a traffic information system. The navigation system is configured to combine information from the digital road map with information about the flow of traffic in order to identify traffic congestion zones.

In a further variant, the motor vehicle comprises a device for car-to-X communication. As part of the car-to-X communication, the motor vehicle communicates with an infrastructure, e.g. a traffic management system. Messages received by the motor vehicle via car-to-X communication are used for situation identification. Such messages provide specifics about the section of road in front of the vehicle. By factoring in these specifics, it can then be determined whether a situation ideal for purely electric driving may exist.

In other words, the motor vehicle according to the disclosure comprises appropriate means, in particular a computer system, for carrying out the method according to the disclosure.

It is understood that the features specified above may be used not only in the combination specified in each case, but also in other combinations or alone, without departing from the scope of the present disclosure.

The invention claimed is:

1. A method for operating a motor vehicle, comprising:
providing a drive train with an internal combustion engine, an electric motor, and an automatic transmission, the electric motor arranged between the internal combustion engine and the transmission; and
maximizing, in a hybrid operating mode of the motor vehicle, a proportion of a purely electric driving operation by controlling the automatic transmission so a resulting rotational speed is not lower than a preset minimum value, which is within a range of 0 to 100 rpm below a breakpoint speed of the electric motor.

2. The method according to claim 1, wherein the proportion of the purely electric driving operation is maximized when the motor vehicle identifies a situation to maximize the proportion of purely electric driving.

3. The method according to claim 2, wherein the situation is driving in an urban area.

4. The method according to claim 2, wherein the situation is stop-and-go traffic.

5. The method according to claim 2, wherein the motor vehicle identifies the situation based on the vehicle speed.

6. The method according to claim 2, wherein the motor vehicle identifies the situation by a satellite-based positioning combined with information from a digital road map.

7. The method according to claim 2, wherein the motor vehicle identifies the situation via a car-to-X communication.

8. A motor vehicle, comprising:
a drive train with an internal combustion engine, an electric motor, and an automatic transmission, the electric motor arranged between the internal combustion engine and the transmission; and
a device to control the automatic transmission during a purely electric driving operation of the motor vehicle so that a resulting rotational speed is not lower than a preset minimum value within the range of 0 to 100 rpm below a breakpoint speed of the electric motor.

9. The motor vehicle according to claim 8, further comprising means for determining whether the proportion of purely electric driving operation should be maximized.

10. The motor vehicle according to claim 9, wherein the means for determining whether the proportion of purely electrical driving operation should be maximized includes an electronic navigation system, which has a GPS receiver or a transmitter/receiver for mobile communications, and a digital road map.

11. The method according to claim 3, wherein the motor vehicle identifies the situation based on the vehicle speed.

12. The method according to claim 4, wherein the motor vehicle identifies the situation based on the vehicle speed.

13. The method according to claim 3, wherein the motor vehicle identifies the situation by a satellite-based positioning combined with information from a digital road map.

14. The method according to claim 4, wherein the motor vehicle identifies the situation by a satellite-based positioning combined with information from a digital road map.

15. The method according to claim 5, wherein the motor vehicle identifies the situation by a satellite-based positioning combined with information from a digital road map.

16. The method according to claim 3, wherein the motor vehicle identifies the situation via a car-to-X communication.

17. The method according to claim 4, wherein the motor vehicle identifies the situation via a car-to-X communication.

18. The method according to claim 5, wherein the motor vehicle identifies the situation via a car-to-X communication.

19. The method according to claim 6, wherein the motor vehicle identifies the situation via a car-to-X communication.

* * * * *